US009053244B2

(12) United States Patent
Varma et al.

(10) Patent No.: US 9,053,244 B2
(45) Date of Patent: Jun. 9, 2015

(54) UTILIZATION-AWARE LOW-OVERHEAD LINK-WIDTH MODULATION FOR POWER REDUCTION IN INTERCONNECTS

(75) Inventors: Ankush Varma, Hillsboro, OR (US); Buck W. Gremel, Olympia, WA (US); Robert G. Blankenship, Tacoma, WA (US); Krishnakanth V. Sistla, Beaverton, OR (US); Michael F. Cole, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 13/536,852

(22) Filed: Jun. 28, 2012

(65) Prior Publication Data

US 2014/0006673 A1    Jan. 2, 2014

(51) Int. Cl.
*G06F 13/40* (2006.01)
*G06F 1/32* (2006.01)

(52) U.S. Cl.
CPC ......... *G06F 13/4018* (2013.01); *Y02B 60/1228* (2013.01); *Y02B 60/1235* (2013.01); *G06F 1/3203* (2013.01)

(58) Field of Classification Search
CPC ........................... G06F 13/4018; G06F 1/3203
USPC .................... 710/307; 713/323–324
See application file for complete search history.

(56) References Cited

U.S. PATENT DOCUMENTS

| 5,396,635 | A | 3/1995 | Fung |
| 5,781,784 | A | 7/1998 | Mckinley |
| 6,009,488 | A | 12/1999 | Kavipurapu |
| 6,222,825 | B1 | 4/2001 | Mangin et al. |
| 6,484,223 | B1 | 11/2002 | Lenz |
| 6,526,469 | B1 | 2/2003 | Drehmel et al. |
| 6,665,742 | B2 | 12/2003 | Owen et al. |
| 7,136,953 | B1 | 11/2006 | Bisson et al. |
| 7,188,263 | B1 | 3/2007 | Rubinstein et al. |
| 7,313,712 | B2 | 12/2007 | Cherukuri et al. |
| 7,418,005 | B2 | 8/2008 | Arima |
| 7,660,261 | B2 | 2/2010 | Keromytis et al. |
| 7,664,146 | B1 | 2/2010 | Reches |

(Continued)

FOREIGN PATENT DOCUMENTS

| EP | 1 599 006 A1 | 11/2005 |
| JP | 04-359335 A | 12/1992 |

(Continued)

OTHER PUBLICATIONS

PCI Express Base Specification, Revision 1.0, Jul. 22, 2002, Revised Version 1.0a on Apr. 15, 2003, pp. 1-8 and 165-189.

(Continued)

*Primary Examiner* — Nimesh G Patel
(74) *Attorney, Agent, or Firm* — Alpine Technology Law Group LLC (57) ABSTRACT

Methods and apparatus relating to low-overhead utilization-aware link-width modulation to reduce power consumption in interconnects are described. In one embodiment, a link width modulation logic adjusts the width of an interconnect link. More particularly, the link width modulation logic causes the interconnect link to transition from a first width to a second width based on comparison of a utilization value associated with the interconnect link against at least one of a plurality of utilization threshold values. Other embodiments are also disclosed and claimed.

24 Claims, 6 Drawing Sheets

(56) References Cited

U.S. PATENT DOCUMENTS

| | | | |
|---|---|---|---|
| 8,046,488 | B2 | 10/2011 | Cherukuri et al. |
| 8,208,467 | B2 | 6/2012 | Kapil et al. |
| 8,868,955 | B2 | 10/2014 | Iyer et al. |
| 2002/0087716 | A1 | 7/2002 | Mustafa |
| 2002/0103945 | A1 | 8/2002 | Owen et al. |
| 2002/0112099 | A1 | 8/2002 | Collier |
| 2003/0088799 | A1 | 5/2003 | Bodas |
| 2003/0185308 | A1 | 10/2003 | Schoenborn |
| 2003/0221026 | A1 | 11/2003 | Newman |
| 2004/0128576 | A1 | 7/2004 | Gutman et al. |
| 2004/0153952 | A1 | 8/2004 | Sharma et al. |
| 2004/0264466 | A1 | 12/2004 | Huang |
| 2005/0188232 | A1 | 8/2005 | Weng et al. |
| 2005/0259599 | A1 | 11/2005 | Cherukuri et al. |
| 2005/0259696 | A1 | 11/2005 | Steinman et al. |
| 2005/0262284 | A1 | 11/2005 | Cherukuri et al. |
| 2006/0015761 | A1 | 1/2006 | Kwa et al. |
| 2006/0034295 | A1* | 2/2006 | Cherukuri et al. ....... 370/395.52 |
| 2006/0034611 | A1 | 2/2006 | Li |
| 2007/0239922 | A1 | 10/2007 | Horigan |
| 2008/0002585 | A1* | 1/2008 | Safranek et al. .............. 370/235 |
| 2009/0276558 | A1 | 11/2009 | Goma et al. |
| 2009/0282227 | A1* | 11/2009 | Hoover et al. ................. 712/227 |
| 2013/0077701 | A1* | 3/2013 | Tsien et al. .................... 375/259 |
| 2013/0346772 | A1* | 12/2013 | Abou Gazala et al. ....... 713/320 |
| 2014/0019654 | A1* | 1/2014 | Trivedi et al. ................. 710/107 |
| 2014/0095751 | A1 | 4/2014 | Iyer et al. |

FOREIGN PATENT DOCUMENTS

| | | |
|---|---|---|
| JP | 08-223390 A | 8/1996 |
| JP | 2000-261435 A | 9/2000 |
| JP | 2001-022690 A | 1/2001 |
| JP | 2002-259327 A | 9/2002 |
| JP | 2003-037613 A | 2/2003 |
| WO | 2014/051765 A1 | 4/2014 |

OTHER PUBLICATIONS

Office Action received for European Patent Application No. 04255079.8, mailed on Sep. 6, 2006, 10 pages.
Office Action received for European Patent Application No. 04255079.8, mailed on Nov. 28, 2008, 5 pages.
Office Action received for European Patent Application No. 04255079.8, mailed on Mar. 19, 2007, 4 pages.
Search Report received for European Patent Application No. 04255079.8, mailed on Sep. 16, 2005, 3 pages.
Notice of Grant received for European Patent Application No. 04255079.8, mailed on Mar. 30, 2009, 6 pages.
Office Action received for U.S. Appl. No. 10/850,851, mailed on Feb. 4, 2009, 20 pages.
Office Action received for U.S. Appl. No. 10/850,851, mailed on Aug. 31, 2009, 27 pages.
Office Action received for U.S. Appl. No. 10/850,851, mailed on Feb. 2, 2010, 26 pages.
Office Action received for U.S. Appl. No. 10/850,851, mailed on Jul. 23, 2010, 21 pages.
Office Action received for U.S. Appl. No. 10/850,851, mailed on Dec. 15, 2010, 22 pages.
Ex Parte Quayle Action received for U.S. Appl. No. 10/850,851, mailed on May 23, 2011, 6 pages.
Notice of Allowance received for U.S. Appl. No. 10/850,851, mailed on Jun. 23, 2011, 6 pages.
International Search Report and Written Opinion received for PCT Patent Application No. PCT/US2013/047251, mailed on Oct. 18, 2013, 9 pages.
Office Action received for German Patent Application No. 112006001541.9, mailed on Oct. 29, 2008, 17 pages of English Translation and 3 pages of German Office Action.
Notice of Allowance received for U.S. Appl. No. 13/175,794, mailed on Jun. 20, 2014, 5 pages.
Non-Final Office Action received for U.S. Appl. No. 13/175,794, mailed on Dec. 17, 2013, 8 pages.
Office Action received for Japanese Patent Application No. 2004-235926, mailed on Feb. 3, 2009, 9 pages of English Translation and 8 pages of Japanese Office Action.
Office Action received for Japanese Patent Application No. 2004-235926, mailed on Oct. 27, 2009, 6 pages of English Translation and 6 pages of Japanese Office Action.
Office Action received for Japanese Patent Application No. 2004-235926, mailed on Jan. 29, 2008, 5 pages of English Translation.
Notice of Grant received for Chinese Patent Application No. 200410086986.5, mailed on Feb. 5, 2010, 1 page of English Translation and 2 pages of Chinese Notice of Grant.
Office Action received for Chinese Patent Application No. 200410086986.5, mailed on Jun. 19, 2009, 5 pages of English Translation and 6 pages of Chinese Office Action.
Office Action received for Chinese Patent Application No. 200410086986.5, mailed on Nov. 28, 2008, 4 pages of English Translation and 5 pages of Chinese Office Action.
International Search Report and Written Opinion received for PCT Patent Application No. PCT/US2006/024193, mailed on Feb. 1, 2007, 11 pages.

\* cited by examiner

UTILIZATION-AWARE LOW-OVERHEAD LINK-WIDTH MODULATION FOR POWER REDUCTION IN INTERCONNECTS

FIELD

The present disclosure generally relates to the field of electronics. More particularly, some embodiments relate to low-overhead link-width modulation in interconnects that are utilization-aware to achieve power consumption reduction.

BACKGROUND

Computer systems are generally made up of components that may communicate with one another for various purposes. Links that interconnect computer components provide a mechanism for transferring data and each link may include a plurality of "lanes", where each lane transfers a bit of data in a given cycle. The number of lanes to be used during communication generally defines the link width which in turn effectively controls the bandwidth of the link. As such, wider links provide a larger bandwidth than narrower links. On the other hand, wider links tend to consume more power because of the additional circuitry that supports the additional lanes. Link width, however, typically does not change under conventional techniques and a link may be wider than necessary to address the worse case scenario, resulting in excessive power consumption.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may provide for low-overhead link-width modulation in interconnects (which may be utilization-aware), e.g., to reduce power consumption. More specifically, some current High-Speed Data Links (HSDLs) may consume several watts of I/O power to drive signals on long wires. One way to increase their power efficiency is to reduce the link width when the link is at low average utilization. However, this approach would create the problem of determining when to enter or exit a low-width mode without unduly penalizing system performance. By contrast, at least one embodiment provides a technique for dynamically determining when to enter or exit a low-power reduced-width mode based on a time-averaged (e.g., low-pass-filtered) bandwidth measurement with hysteresis. Such techniques may in turn use a very small amount of hardware resources (e.g., a single up/down counter and a rotating shift-register) as will be further discussed below.

Moreover, some current products do not perform link-width modulation (also referred to herein as "L0$p$") at all. Instead, they may detect idle periods and enter a low-power sleep state (L0$s$) in which no data may be transmitted. In an embodiment, link width is modulated to allow systems running at low bandwidth to run in a reduced-width mode (such as half or quarter width) instead of turning off completely. In addition, some embodiments use a low-overhead bandwidth-sensitive mechanism to allow for detection of a low (but nonzero) and/or steady bandwidth condition better than would be possible based on an implementation relying on an idle timer (in part because some embodiments utilize averaging, hysteresis, and/or thresholding).

As discussed herein, "L0" generally refers to link operating at full width (i.e., all lanes) in both directions, "L0$s$" generally refers to link operating at zero width (i.e., no lanes) in one direction, "L1" generally refers to link in zero width (i.e., no lanes) in both directions, and "L0$p$" generally refers to link operating at partial width (i.e., a reduced number of lanes, e.g., half the number of lanes) in one direction. Additionally, the basic unit of transfer over a link is referred to herein as a "flit" (which may be 80 bits in an embodiment, e.g., with 8 bits for error detection, 8 bits for link-layer header, and 64 bits for data, although other configurations may be used).

Figure 1:
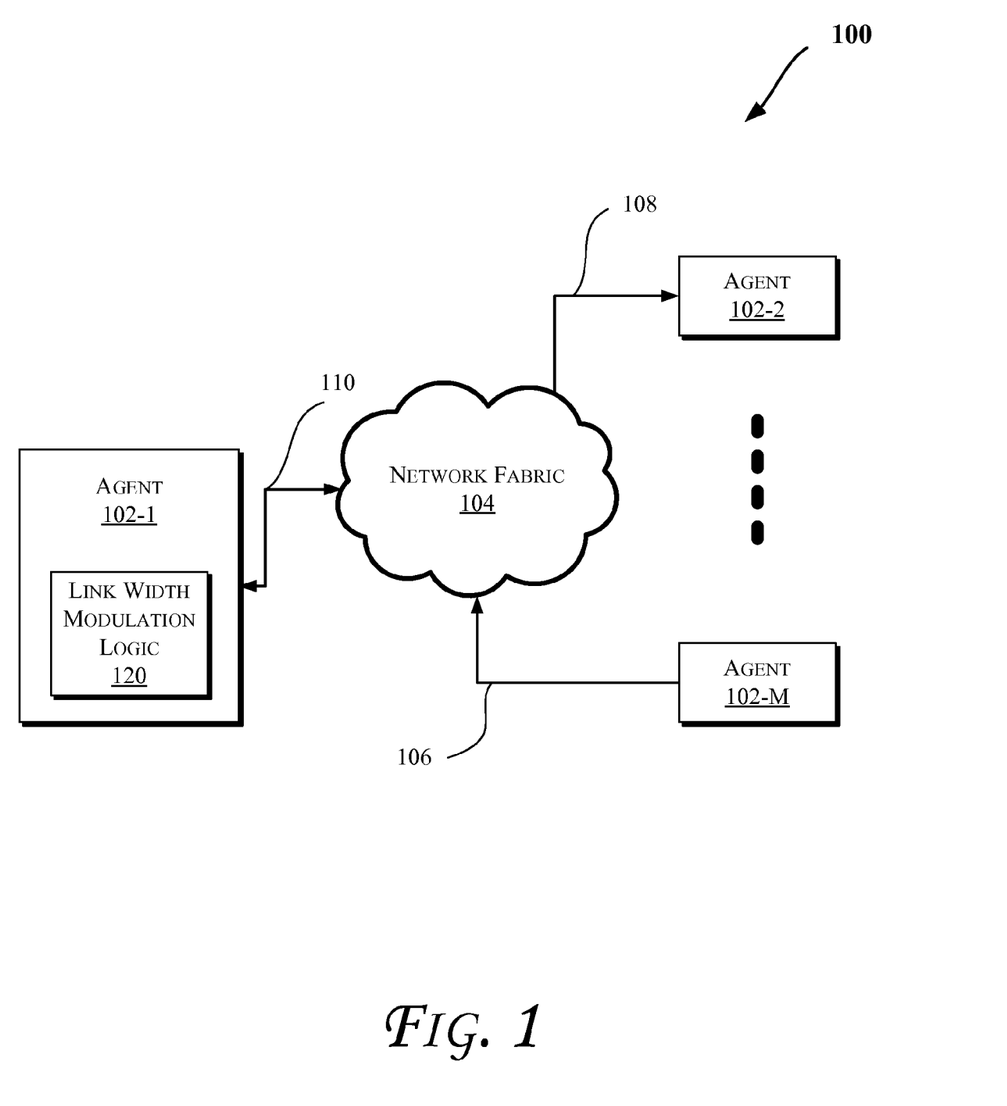
FIGS. 1-2 and 5-6 illustrate block diagrams of embodiments of computing systems, which may be utilized to implement various embodiments discussed herein.

Various embodiments are discussed herein with reference to a computing system component, such as the components discussed herein, e.g., with reference to FIGS. 1-2 and 5-6. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2 and 5-6.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may include a Link Width Modulation (LWM) logic 120. In some embodiments each CPU socket present in a computing system may include a LWM logic 120 as will be further discussed with reference to FIG. 2-3, for example.

Figure 2:
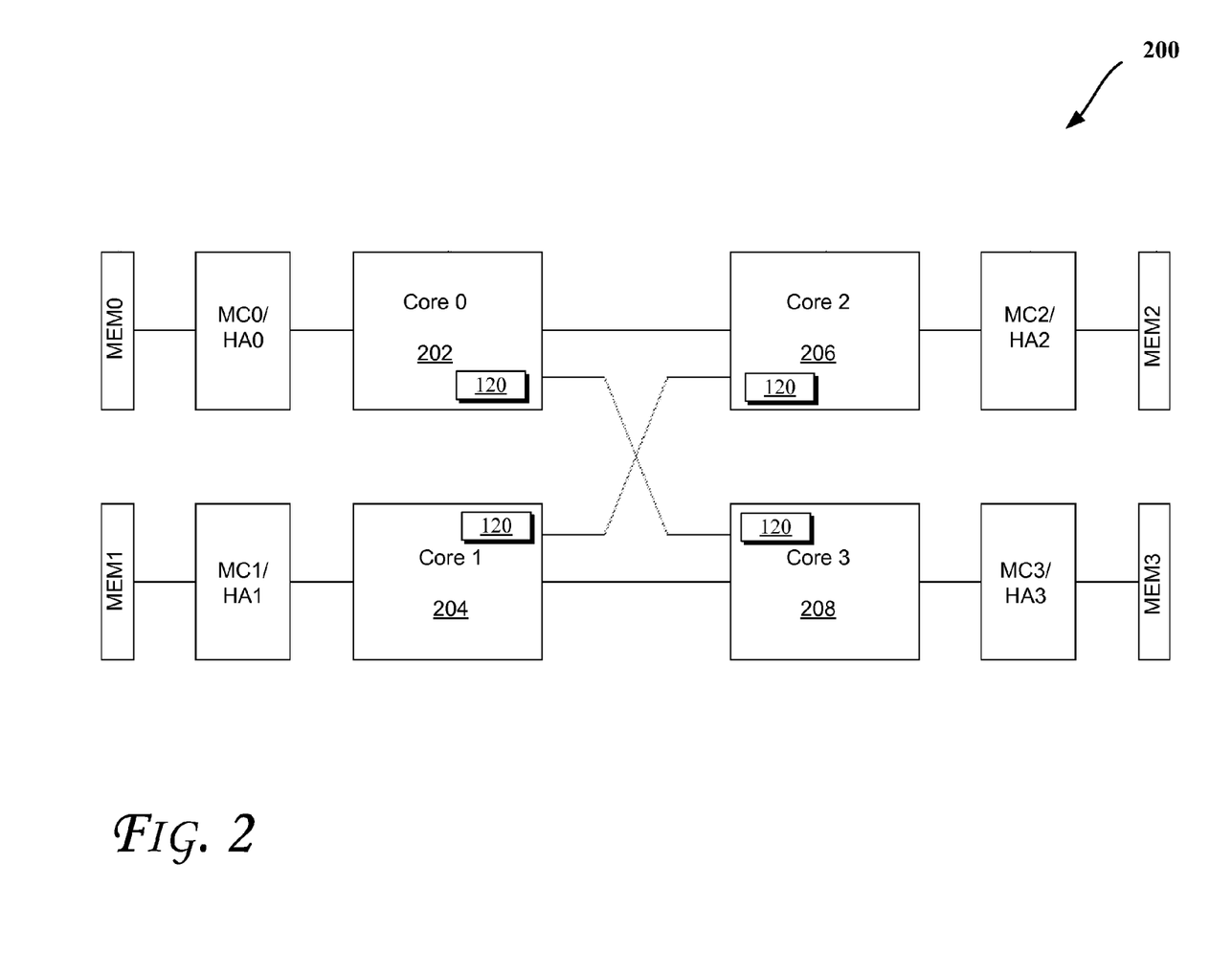

More specifically, FIG. 2 is a block diagram of a computing system 200 in accordance with an embodiment. System 200 may include a plurality of sockets 202-208 (four shown but some embodiments may have more or less socket). Each socket may include a processor and a LWM logic 120. Also, each socket may be coupled to the other sockets via a point-to-point (PtP) link, such as a Quick Path Interconnect (QPI). As discussed with respect the network fabric 104 of FIG. 1, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 512 of FIG. 5). In some embodiments, the memory controller (MC)/Home Agent (HA) (such as MC0/HA0 through MC3/HA3) may be the same or similar to agent 102-1 of FIG. 1 and the memory, labeled as MEM0 through MEM3, may be the same or similar to memory discussed with reference to any of the figures herein. Generally, processing/caching agents may send requests to a home node for access to a memory address with which a corresponding "home agent" is associated. Also, in one embodiment, MEM0 through MEM3 may be configured to mirror data, e.g., as master and slave. Also, one or more components of system 200 may be included on the same integrated circuit die in some embodiments.

An implementation such as shown in FIG. 2 thus may be for a socket glueless configuration with mirroring. For example, data assigned to a memory controller (such as MC0/HA0) may be mirrored to another memory controller (such as MC3/HA3) over the PtP links.

In some legacy systems, a complete link may be turned off to save power during idle periods. However, during periods of low utilization, it may be more efficient to operate the link at a lower width rather than shutting down the whole link (e.g., to reduce delay associated with restarting a link). To this end, an embodiment provides a protocol (e.g., based on timers) that allows a link to be available for a longer period of time, while changing widths.

Figure 3:
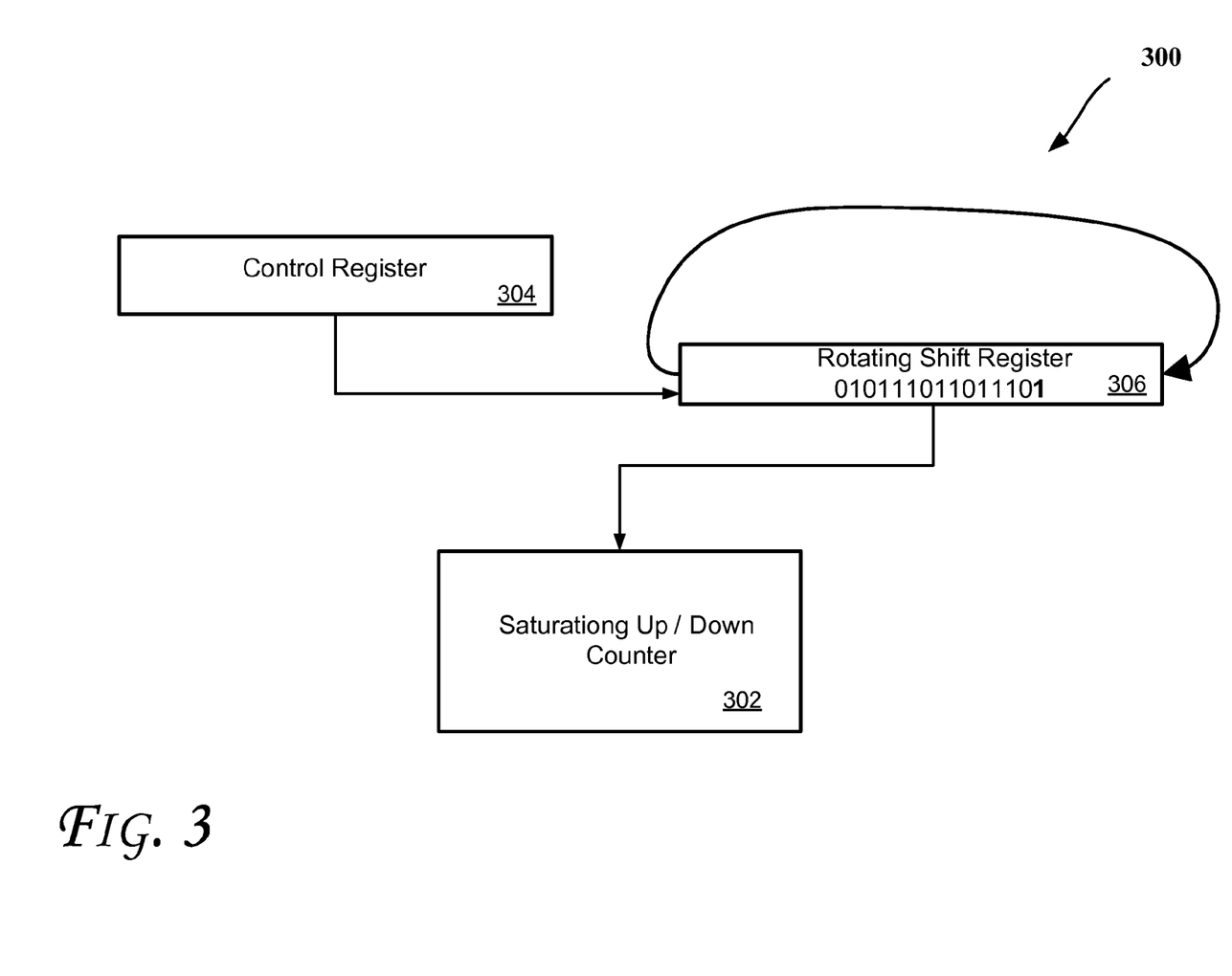
FIG. 3 illustrates portions of a link width modulation logic to reduce power consumption and provide a low-overhead solution for interconnects, according to some embodiments.

More specifically, FIG. 3 illustrates a block diagram of portions of a link width modulation logic 300 to reduce power consumption and provide a low-overhead solution for interconnects (e.g., based on averaging, thresholding, and/or hysteresis of bandwidth measurements), according to some embodiments. In an embodiment, the logic 120 discussed with reference to the remaining figures includes logic 300.

Figure 4:
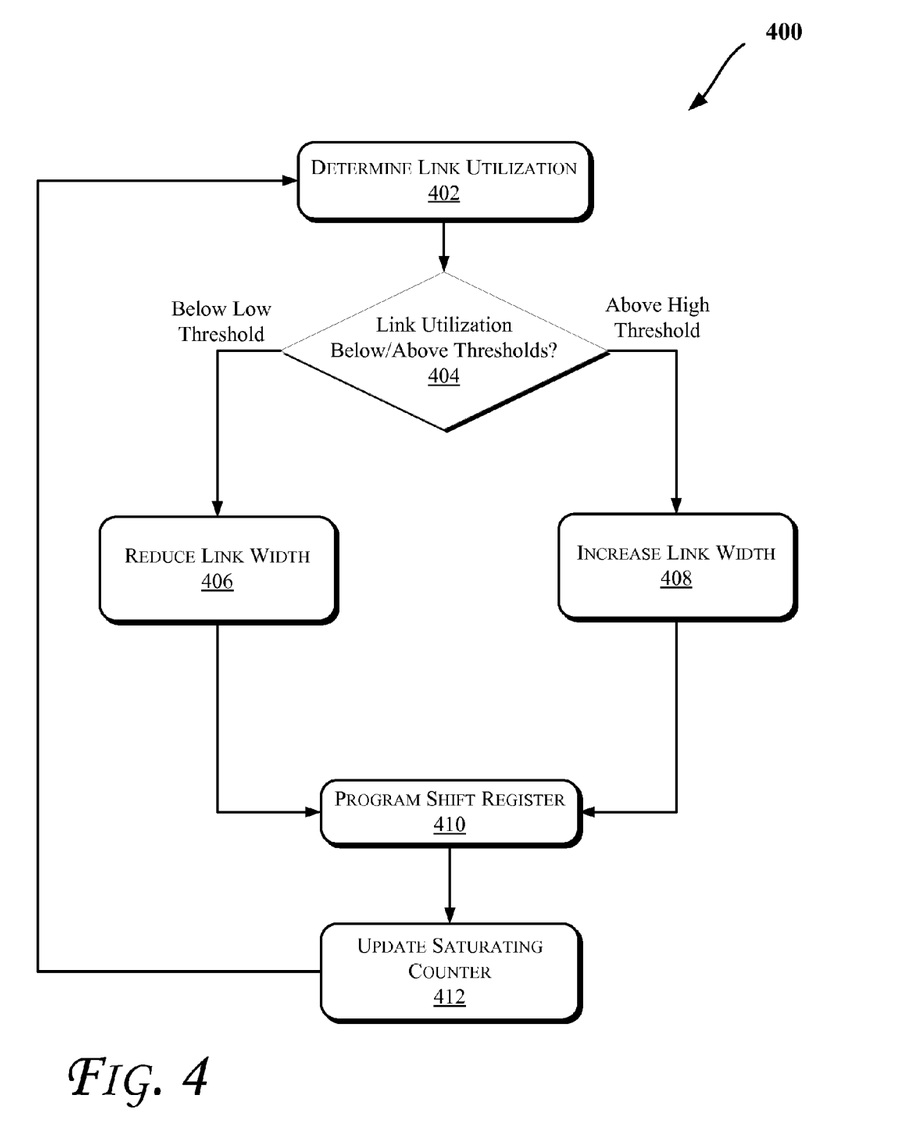
FIG. 4 illustrates a flow diagram of a method to perform link width modulation, according to an embodiment.

FIG. 4 illustrates a flow diagram of a method 400 to perform link width modulation, according to an embodiment. In an embodiment, various components discussed with reference to FIGS. 1-3 and 5-6 may be utilized to perform one or more of the operations discussed with reference to FIG. 4.

Referring to FIGS. 3-4, the L0$p$ (e.g., reduced width or half-width mode) approach may use a saturating up/down counter 302 to determine (e.g., average) the link utilization at an operation 402. The counter is saturating in the sense that once it is full it stays full and it is not going to reset (unlike a wrap around type counter that resets once full). If utilization (as indicated by the value stored in the counter 302) is below a low utilization threshold value (e.g., T1) at operation 404, the link width is reduced at an operation 406. If utilization (as indicated by the value stored in the counter 302) is above a high utilization threshold value (e.g., T2) at operation 404, the link width is increased at an operation 408.

In an embodiment, a control register 304 may store two different bit patterns (one for the high utilization threshold and one for the low utilization threshold). In turn, the ratio of ones to zeros in the pattern provide the average rate at which the counter is decremented (i.e., deciding the bandwidth threshold). A shift register 306 rotates through the selected pattern (provided by the bit patterns of the control register 304), e.g., where a "1" indicates that the counter should be decremented and transmission of a flit increments the counter. Depending on the implementation, the role of "1" with respect to the counter increment/decrement may be reversed. Furthermore, each time a data packet could by transmitted (whether it was transmitted or not), the last shift register bit is read, and the counter 302 is decremented if it is a 1. Accordingly, the saturation counter 302 may be updated at operation 412.

As shown in FIG. 4, the shift register 306 may be reprogrammed (e.g., based on the patterns stored in the control register) each time link width is switched at operation 410. For example, when the interconnect is at full width, the low threshold may be programmed, e.g., switching to half width if the counter becomes empty (indicating that bandwidth is below the low threshold). Also, when the interconnect is at reduced width (e.g. half width), the high threshold may be programmed, for example, switching to full width if the counter becomes full (indicating that bandwidth is above the threshold).

Accordingly, in some embodiments, when the counter 302 is full, the average utilization exceeds the programmed threshold, and when the counter is empty, the average utilization is below the programmed threshold. Also, with a full counter at low threshold, the link width may be increased. And, with an empty counter at high threshold, the link width may be decreased. In an embodiment, when the link is at full width, the counter is set to search for dropping below the low threshold (T1) at operation 404. In one embodiment, when the link is at half width, the counter is set to search for rising above the high threshold (T2) at operation 404. Also, the effective width of the counter 302 may be changed to modify the time period over which the utilization is averaged.

The pseudo code below is provided as an example and describes the corresponding state machine for the simple case where there are two sample link widths (i.e., full width and half width) in accordance with some embodiments:

```
uInt counter;       // saturating counter L0_Window bits wide
uInt leakPattern;   // Pattern of 0s and 1s that define when a counter
                    // leaks.
```

-continued

```
Bool oddCycle;      // Toggled every cycle. E.g., decrement only on
                    // odd cycles to make the leak pattern smaller by a
                    // factor of 2.
// Initial values
counter = MAX/2;
leakPattern = Low_BW_Pattern;
Bool half_width = false;
// rotating sequence of 1's and 0's that determine frequency of counter
// decrements.
// Initialized to the low bandwidth pattern.
// Set to the high bandwidth pattern when the link is at low bandwidth.
oddCycle = false;
// Called each time a possible flit (whether or not actually transmitted).
void cycle_advance( ) {
    oddCycle = ! oddCycle;
    if (shouldLeak( )) {
        counter--; // Its time to leak this counter.
    }
    if (flitTransmitted != idle_flit) {
        // actually transmitted a data flit.
        counter++;
    }
    if (half_width && isFull( )) {
        // Transition to full width.
        half_width = false;
        leakPattern = High_BW_Pattern;
    }
    if (!half_width && isEmpty( )) {
        // Transition to half width.
        half_width = true;
        leakPattern = Low_BW_Pattern;
    }
}
Bool shouldLeak( ) {
    Rotate(leakPattern); //Doesn't matter whether rotate left or right.
    // Its time to leak if it is an odd cycle and the pattern's last bit is one.
    Return (oddCycle && (leakPattern % 2));
}
// may ignore the last bit in the counter for full/empty detection
// because it may be noisy (e.g., since it may toggle every cycle or so)
// This also may provide slightly cheaper hardware (one less bit to
// compare).
// The shift operation does not have to be performed in hardware; for
// example, just dropping the last bit achieves the same result.
Bool isFull( ) {
    return ((counter >> 1) == <all ones>);
}
Bool isEmpty( ) {
    Return ((counter >> 1) == 0);
}
```

Since there are only two modes discussed with reference to the pseudo code above, a single counter and shift register may be used. This is an optional optimization. When the link is in half-width state, the mechanism above checks whether a transition to full-width is needed and vice-versa Implementing more than two modes (e.g., ⅛, ¼, ½, and/or full width) requires two counters: one for detecting the need for increased link width, and another for detecting the need to reduce it. In general, two counters and shift registers are sufficient for managing any number of modes. However, N modes will still need N-1 thresholds to be stored for programming into the shift registers.

Also, with respect to only supporting a half-width mode, both high and low thresholds may be at the <50% mark. Hence, the size of the shift register needed may be halved by treating it as 0 every even cycle and reading it only every odd cycle. This is an optional optimization. The counter in the above pseudo code example provides a low-pass filter (namely, it averages flits over time). The effective time window may be increased by simply using a wider counter with more bits. Further, having a high threshold and a low threshold provides hysteresis since a threshold has to be crossed before the system changes state.

In some embodiments, if the link width is tracked over time, the following four conditions may be present. First, constant bandwidth-demand with bandwidth below a certain threshold (e.g., T1) would result in reduced-width mode residency of 100%. Second, constant bandwidth-demand with bandwidth above a certain threshold (e.g., T2) would result in full-width mode residency of 100%. Third, constant bandwidth-demand with medium bandwidth (e.g., between T1 and T2) would result in no change in the link width mode (i.e., hysteresis). Fourth, demand with a transition from low to high bandwidth would result in link width transitioning from reduced-width to full-width after a delay. This delay may be linearly proportional to the difference between the delivered link bandwidth and the threshold T2 above. This could be illustrated by plotting the delay versus the delivered bandwidth, for example.

Figure 5:
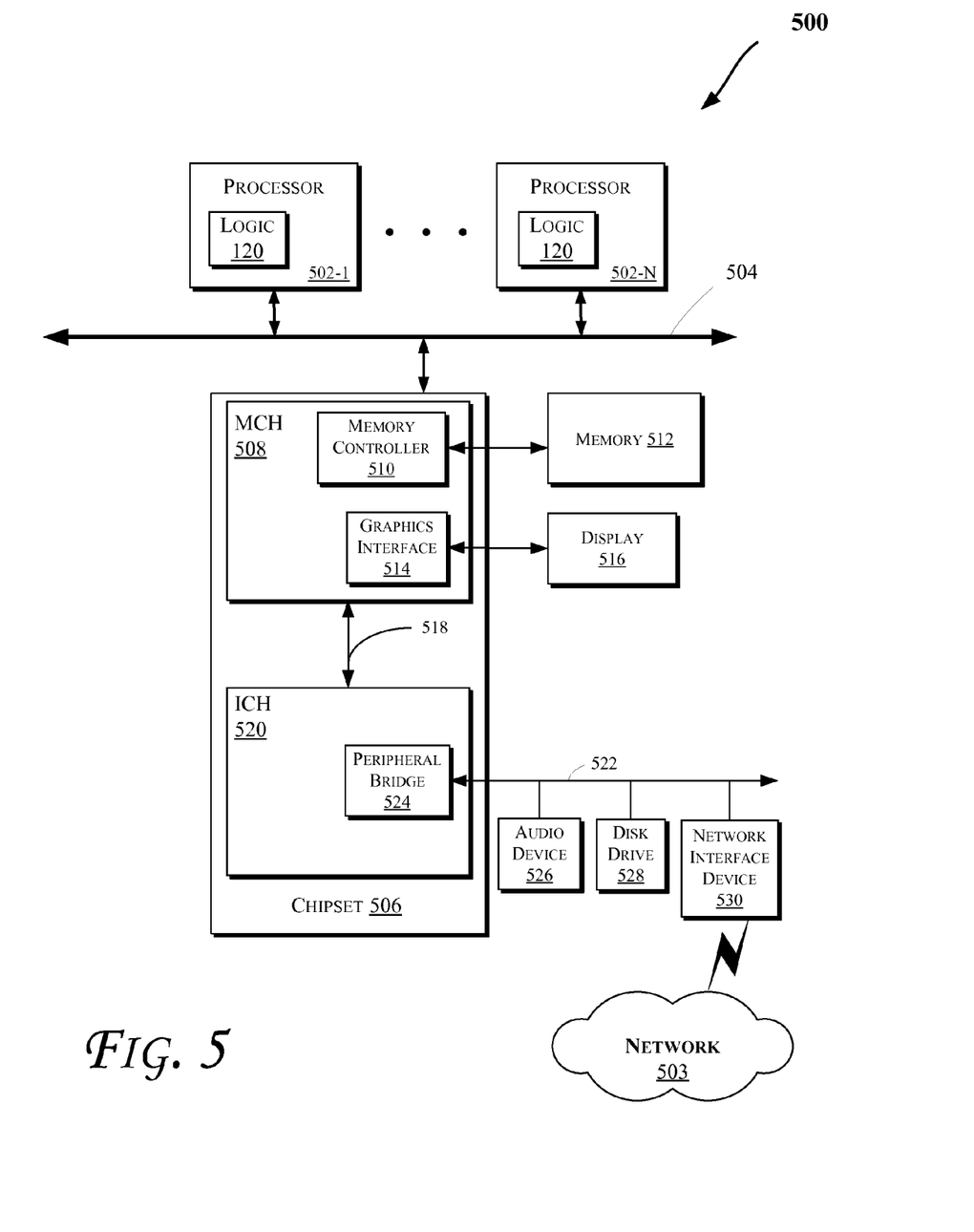

FIG. 5 illustrates a block diagram of a computing system 500 in accordance with an embodiment of the invention. The computing system 500 may include one or more central processing unit(s) (CPUs) 502-1 through 502-N or processors (collectively referred to herein as "processors 502" or more generally "processor 502") that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Also, the operations discussed with reference to FIGS. 1-4 may be performed by one or more components of the system 500. In some embodiments, the processors 502 may be the same or similar to the processors 202-208 of FIG. 2. Furthermore, the processors 502 may include the link width modulation logic 120.

A chipset 506 may also communicate with the interconnection network 504. In an embodiment, the chipset 506 may include LWM logic 120. The chipset 506 may include a memory controller hub (MCH) 508. The MCH 508 may include a memory controller 510 that communicates with a memory 512. The memory 512 may store data, including sequences of instructions that are executed by the CPU 502, or any other device included in the computing system 500. For example, the memory 512 may store data corresponding to an operation system (OS). In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

Additionally, one or more of the processors 502 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 500. For example, the cache may locally cache data stored in a memory 512 for faster access by the components of the processors 502. In an embodiment, the cache (that may be shared) may include a mid-level cache and/or a last level cache (LLC). Also, each processor 502 may include a level 1 (L1) cache. Various components of the processors 502 may communicate with the cache directly, through a bus or interconnection network, and/or a memory controller or hub. Also, each of the processors 502 (or each core present in the processors 502) may include the logic 120 in some embodiments.

The MCH 508 may also include a graphics interface 514 that communicates with a display device 516, e.g., via a graphics accelerator. In one embodiment of the invention, the graphics interface 514 may communicate with the graphics accelerator via an accelerated graphics port (AGP). In an embodiment of the invention, the display 516 (such as a flat panel display, touch screen, etc.) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503, e.g., via a wired or wireless interface). Further, the network interface device 530 may be coupled to an antenna (not shown) to wirelessly (e.g., via an Institute of Electrical and Electronics Engineers (IEEE) 802.11 interface (including IEEE 802.11a/b/g/n, etc.), cellular interface, 3G, 4G, LPE, etc.) communicate with the network 503). Other devices may communicate via the bus 522. Also, various components (such as the network interface device 530) may communicate with the MCH 508 in some embodiments of the invention. In addition, the processor 502 (and/or processors discussed with reference to other figures) and one or more components of a computing system (such as one or more components of the system 500 (such as one or more components of the MCH 508) and/or systems 100/200/600) may be combined to form a single chip, e.g., to provide a System on Chip (SoC).

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
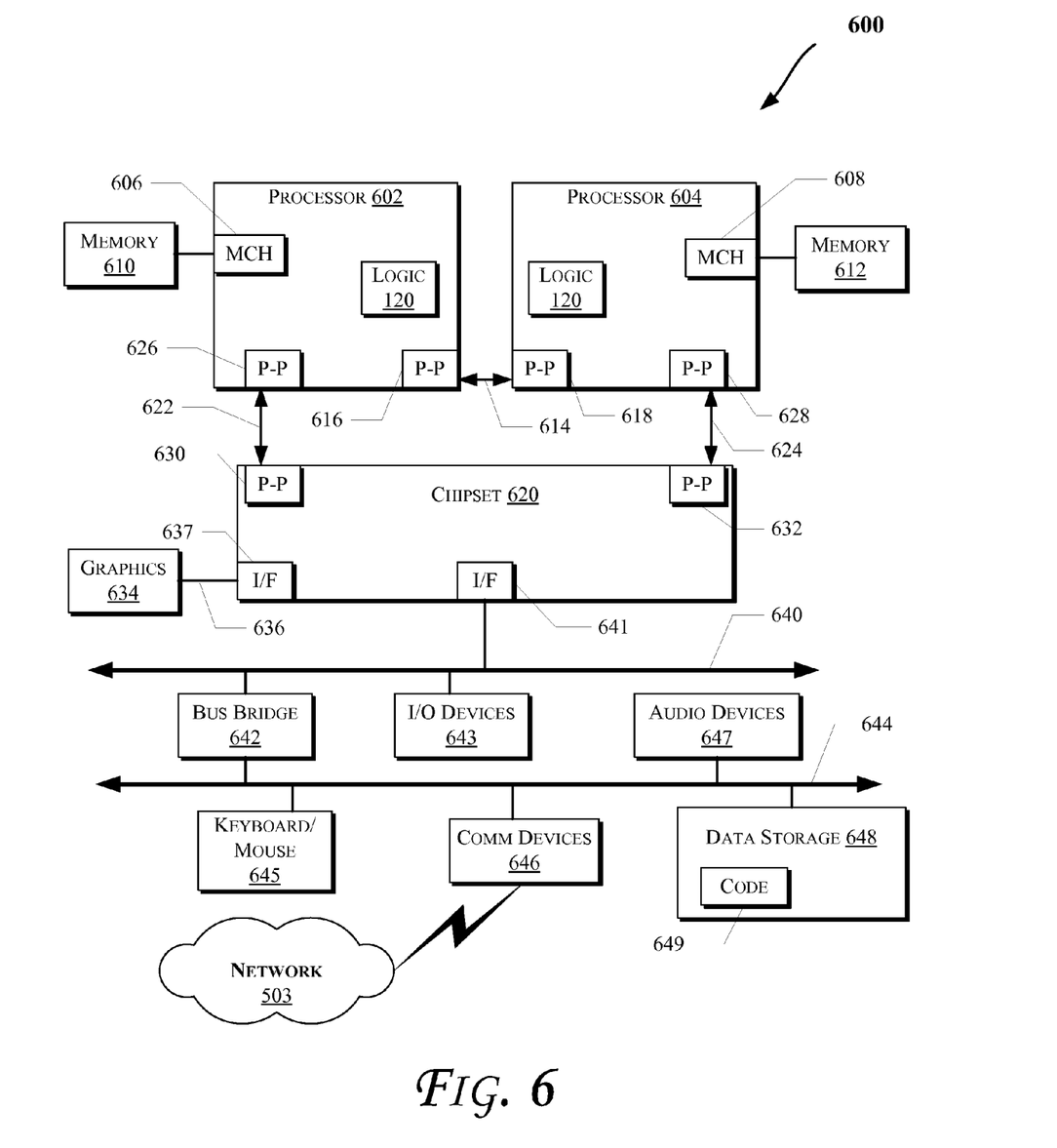

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5. As shown in FIG. 6, the processors 602 and 604 may also include the cache(s) discussed with reference to FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637. As discussed with reference to FIG. 5, the graphics interface 636 may be coupled to a display device (e.g., display 516) in some embodiments.

At least one embodiment of the invention may be provided within the processors 602 and 604 or chipset 620. For example, the link width modulation logic 120 may be provided within the processors 602 and 604 (or within each core of the processors 602 and/or 604). Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   link width modulation logic to adjust a width of an interconnect link coupled between a first agent and a second agent,
   wherein the link width modulation logic is to cause the interconnect link to transition from a first width to a second width based on comparison of a utilization value of the interconnect link with at least one of a plurality of utilization threshold values, wherein the utilization value is to be generated based at least partially on a value stored in a saturating counter, wherein the value stored in the saturating counter is to be updated in response to an indication by a bit pattern to be stored in a register, wherein the register is to be reprogrammed in response to the transition from the first width to the second width.

2. The apparatus of claim 1, wherein the link width modulation logic is to comprise the saturating counter to generate the utilization value.

3. The apparatus of claim 1, wherein the saturating counter is to be incremented in response to transmission of a flit.

4. The apparatus of claim 1, wherein the saturating counter is to be decremented in response to the indication by the bit pattern.

5. The apparatus of claim 1, wherein the plurality of utilization threshold values are to comprise a low utilization threshold value and a high utilization threshold value.

6. The apparatus of claim 5, wherein the first width is caused to be smaller than the second width of the interconnect link in response to a determination that the utilization value is above the high utilization threshold value of the plurality of utilization threshold values.

7. The apparatus of claim 5, wherein the first width is cause to be larger than the second width of the interconnect link in response to a determination that the utilization value is below the low utilization threshold value of the plurality of utilization threshold values.

8. The apparatus of claim 1, further comprising a register to store at least two different bit patterns.

9. The apparatus of claim 8, wherein the at least two different bit patterns are to comprise a first bit pattern for a high utilization threshold value of the plurality of the utilization threshold values and a second bit pattern for a low utilization threshold value of the plurality of the utilization threshold values.

10. The apparatus of claim 1, wherein the interconnect link is to comprise a point-to-point interconnect link.

11. The apparatus of claim 1, wherein at least one of the first agent or the second agent is to comprise a processor having one or more processor cores.

12. The apparatus of claim 1, wherein at least one of the first agent or the second agent is to comprise a processor having one or more sockets.

13. A method comprising:
    adjusting a width of an interconnect link from a first width to a second width at link width modulation logic, wherein the interconnect link is coupled between a first agent and a second agent; and
    comparing a utilization value of the interconnect link with at least one of a plurality of utilization threshold values, wherein adjusting the width of the interconnect link from the first width to the second width is to be performed based on a result of comparing the utilization value of the interconnect link with the at least one of the plurality of utilization threshold values, wherein the utilization value is generated based at least partially on a value stored in a saturating counter, wherein the value stored in the saturating counter is updated in response to an indication by a bit pattern stored in a register, wherein the register is reprogrammed in response to the transition from the first width to the second width.

14. The method of claim 13, further comprising generating the utilization value based on an output of the saturating counter.

15. The method of claim 14, further comprising decrementing the saturating counter in response to the indication by the bit pattern.

16. The method of claim 13, further comprising incrementing the saturating counter in response to transmission of a flit.

17. The method of claim 13, further comprising causing the first width to be smaller than the second width of the interconnect link in response to a determination that the utilization value is above a high utilization threshold value of the plurality of utilization threshold values.

18. The method of claim 13, further comprising causing the first width to be larger than the second width of the interconnect link in response to a determination that the utilization value is below a low utilization threshold value of the plurality of utilization threshold values.

19. A computing system comprising:
    a first processor core and a second processor core;
    a point-to-point interconnect link to couple the first and second processor cores; and
    link width modulation logic to adjust a width of the interconnect link,
    wherein the link width modulation logic is to cause the interconnect link to transition from a first width to a second width based on comparison of a utilization value of the interconnect link with at least one of a plurality of utilization threshold values, wherein the utilization value is to be generated based at least partially on a value stored in a saturating counter, wherein the value stored in the saturating counter is to be updated in response to an indication by a bit pattern to be stored in a register, wherein the register is to be reprogrammed in response to the transition from the first width to the second width.

20. The system of claim 19, wherein the link width modulation logic is to comprise the saturating counter to generate the utilization value.

21. The system of claim 19, wherein the saturating counter is to be incremented in response to transmission of a flit.

22. The system of claim 19, wherein the saturating counter is to be decremented in response to an indication by a bit pattern.

23. The system of claim 19, wherein the first width is caused to be smaller than the second width of the interconnect link in response to a determination that the utilization value is above a high utilization threshold value of the plurality of utilization threshold values.

24. The system of claim 19, wherein the first width is cause to be larger than the second width of the interconnect link in response to a determination that the utilization value is below a low utilization threshold value of the plurality of utilization threshold values.

* * * * *